(12) United States Patent
Jeganathan et al.

(10) Patent No.: US 10,025,372 B2
(45) Date of Patent: *Jul. 17, 2018

(54) TECHNIQUES FOR MANAGING SYSTEM POWER USING DEFERRED GRAPHICS RENDERING

(71) Applicant: INTEL CORPORATION, Santa Clara, CA (US)

(72) Inventors: Nithyananda S. Jeganathan, Hillsboro, OR (US); Rajesh Poornachandran, Beaverton, OR (US); Paul S. Diefenbaugh, Portland, OR (US); Kyungtae Han, Portland, OR (US)

(73) Assignee: INTEL CORPORATION, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/050,222

(22) Filed: Feb. 22, 2016

(65) Prior Publication Data

US 2016/0370848 A1    Dec. 22, 2016

Related U.S. Application Data

(63) Continuation of application No. 13/718,794, filed on Dec. 18, 2012, now Pat. No. 9,269,121.

(51) Int. Cl.
*G06F 1/32* (2006.01)
*G06T 1/20* (2006.01)

(52) U.S. Cl.
CPC .......... *G06F 1/3287* (2013.01); *G06F 1/3228* (2013.01); *G06T 1/20* (2013.01); *G06F 1/3206* (2013.01)

(58) Field of Classification Search
None
See application file for complete search history.

(56) References Cited

U.S. PATENT DOCUMENTS

| 2005/0057571 | A1* | 3/2005 | Stevens | G06F 1/32 345/501 |
| 2010/0020088 | A1* | 1/2010 | Harumoto | B01J 31/04 345/522 |
| 2013/0083042 | A1* | 4/2013 | Sagall | G06T 1/20 345/503 |
| 2013/0328890 | A1 | 12/2013 | Avkarogullari et al. | |

OTHER PUBLICATIONS

Kato, Shinpei, et al. "TimeGraph: GPU scheduling for real-time multi-tasking environments." Proc. USENIX ATC. 2011.*

* cited by examiner

*Primary Examiner* — Ryan M Gray
(74) *Attorney, Agent, or Firm* — Womble Bond Dickinson (US) LLP

(57) ABSTRACT

An apparatus may include a memory to store one or more graphics rendering commands in a queue after generation. The apparatus may also include a processor circuit, and a graphics rendering command manager for execution on the processor to dynamically determine at one or more instances a total execution duration for the one or more graphics rendering commands, where the total execution duration comprises a total time to render the one or more graphics rendering commands. The graphics rendering command manager also may be for execution on the processor to generate a signal to transmit the one or more graphics rendering commands for rendering by a graphics processor when the total execution duration exceeds a graphics rendering command execution window.

17 Claims, 11 Drawing Sheets

TECHNIQUES FOR MANAGING SYSTEM POWER USING DEFERRED GRAPHICS RENDERING

CROSS-REFERENCE TO RELATED APPLICATIONS

This application is a continuation of, claims the benefit of and priority to previously filed U.S. patent application Ser. No. 13/718,794 filed Dec. 18, 2012, entitled "TECHNIQUES FOR MANAGING SYSTEM POWER USING DEFERRED GRAPHICS RENDERING", the subject matter of which is incorporated herein by reference in its entirety.

BACKGROUND

Graphics devices including graphics processors represent a significant source of power consumption in modern devices such as computing devices, communications devices, gaming devices, and other display devices. As graphics performance expectations and requirements continue to increase for future platforms the power envelope for the graphics subsystems increases higher as well. Accordingly, it may be useful for graphics components to be managed more efficiently for the benefit of a platform, such as increasing battery life in a mobile platform.

However, in current generation platforms, including system-on-a-chip (SoC) platforms, graphics sub-system management is not optimal since historically a focus of device design has been to obtain maximum performance from the sub-system without consideration of platform power consumption. In present day apparatus that include graphics displays, a power management policy for graphics devices is typically statically implemented. In one example, when processing graphics commands, if no graphics commands are submitted for a fixed time such as 50 ms (idle time-out), a graphics device may be powered down to a low power state, such as so-called D0i3. Conversely, even if the platform is otherwise completely idle, a single issued graphics command causes the graphics sub-system to immediately wake up. Such a wakeup process for the graphics subsystem may take place without consideration of the deadline by which the graphics command has to be completed, which may cause the graphics subsystem to remain active unduly long. In addition, by not taking into account workload and platform behavior when scheduling graphics subsystem wakeups, these graphics management policies may result in overly frequent transition between low-power and active modes. Such unnecessary transitions can be counter-productive since more energy may be lost by saving the register context of the devices in going to sleep and restoring them when waking up.

Accordingly, there may be a need for improved techniques and apparatus to solve these and other problems.

DETAILED DESCRIPTION

Embodiments are related to processing of graphics commands. In various embodiments, architecture and techniques are provided to improve power conservation in graphics subsystems by deferred execution (also referred to herein as "rendering") of graphics commands. The deferred rendering of graphics commands allows components to enter and remain in low power states (modes) for a more extended duration than in conventional graphics subsystems. In particular embodiments, the duration of lower power modes of operation is extended by providing novel methods for the timing of rendering of graphics commands.

Various embodiments may comprise one or more elements. An element may comprise any structure arranged to perform certain operations. Some elements may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Figure 1:
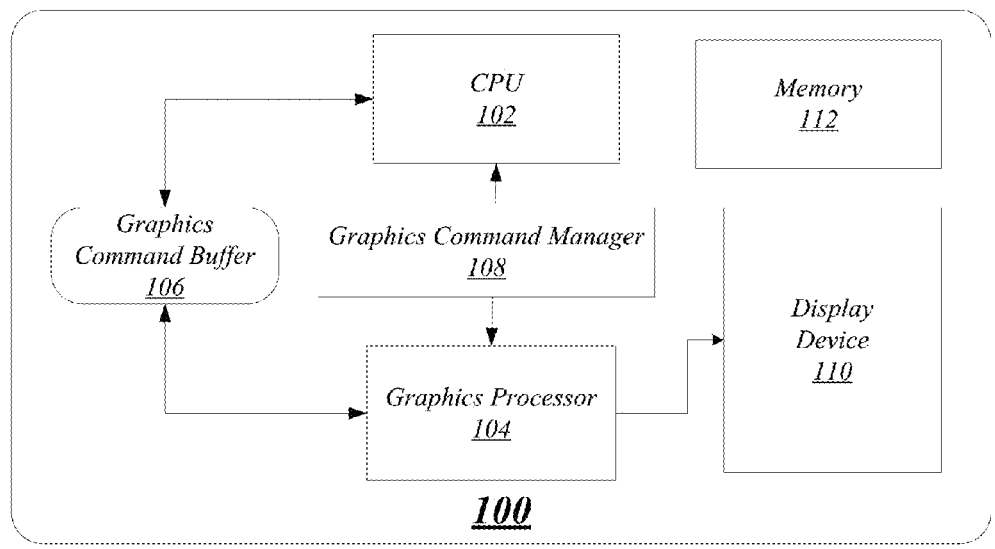
FIG. 1 depicts an embodiment of a system.

FIG. 1 depicts an embodiment of a system 100 consistent with the present embodiments. The system 100 includes a processor circuit (termed "CPU" herein) 102, a graphics processor 104, a graphics command buffer 106, graphics command manager 108, and display device 110, and memory 112. The CPU 102 and graphics processor 104 may form part of a platform that includes other components, such as display engine, memory, memory controllers, and other components as will be apparent to those of skill in the art. In some embodiments, the system 100 may be embodied in a laptop computer, tablet computing device, desktop computer, smartphone, cellular telephone, electronic game device, a home appliance, digital music device, or other electronic device. The embodiments are not limited in this context.

In particular, in various embodiments the CPU 102, graphics command manager 108, and/or graphics processor 104 may comprise various hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Examples of a display device 110 include a liquid crystal display (LCD), light emitting diode display (LED), touch sensitive display, plasma display, cathode ray tube, and other display types. In various embodiments, the system 100 may include various input devices (not shown) including, but not limited to, keyboards, keypads, mouse, joystick, touchscreen, or other input devices.

In operation, and as detailed below, the graphics command manager 108 may be operative on a processor in the system 100 such as the CPU 102 or graphics processor 104 to schedule the submission of graphics commands for rendering so as to alter the operation of graphics processor 104 so as to reduce the amount of time spent in an active state. In this manner, when an application running on the CPU 102 generates graphics commands, the power of graphics processor 104 and/or other system components (not explicitly shown in FIG. 1) may be more efficiently utilized.

Figure 2:
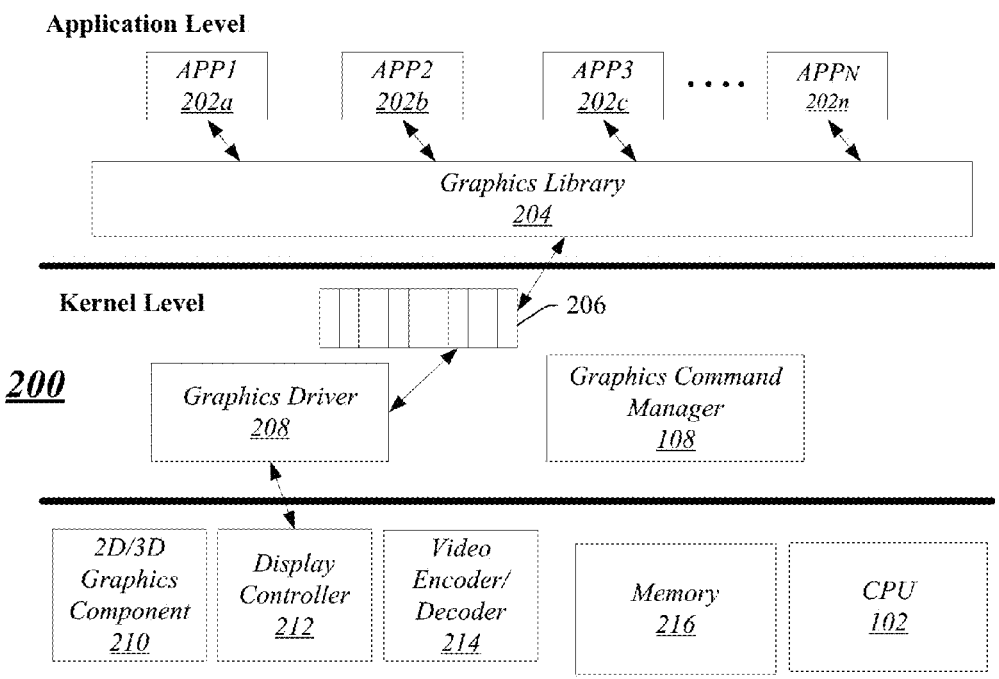
FIG. 2 depicts details of a system architecture according to various embodiments.

FIG. 2 depicts details of a system architecture 200 according to various embodiments. The system architecture 200 includes an application level, kernel level, and hardware level. In this embodiment, the kernel level includes a graphics driver 208 and graphics command manager 108. The hardware level may include a 2D/3D graphics component 210, a display controller 212, and video encoder/decoder 214, in addition to memory 216 and CPU 102. In operation, when a component of an image is to be drawn on the display device 110, one or more applications APP1 202a to APPN 202n may generate graphics rendering commands with the aid of the graphics library 204.

Typically, when one (or more of) the applications APP1 202a to APPN is running, the given application may generate a rendering command at any instant of time. In conventional systems, upon receipt of the rendering commands, the graphics processor, if not active, is awakened, and the commands are rendered and sent to the display device. However, changes are only committed to a frame buffer upon receipt of a signal such as a vertical blanking interrupt (Vblank interrupt) that signals the beginning of vertical blanking interval between successive graphics frames. For example, in a 50 Hz system, the Vblank interrupt signal is sent every 16.6 ms, which also corresponds to the periodicity of committing changes denoted by any graphics commands to the frame buffer. Accordingly, in conventional arrangements for graphics processing, there is no meaningful advantage for rendering graphics commands as they arrive during a graphics frame before the time defined by the Vblank interrupt.

In the embodiment of FIG. 2, this issue is addressed by the graphics command manager 108, which may manage the graphics command queue 206 in such a manner that the commands are not committed to graphics hardware until the necessary time, as detailed in the FIGs. to follow. In this manner, graphics hardware and other system components can remain or be placed in lower power states for longer periods of time as compared to conventional graphics processing systems.

Figure 3A:
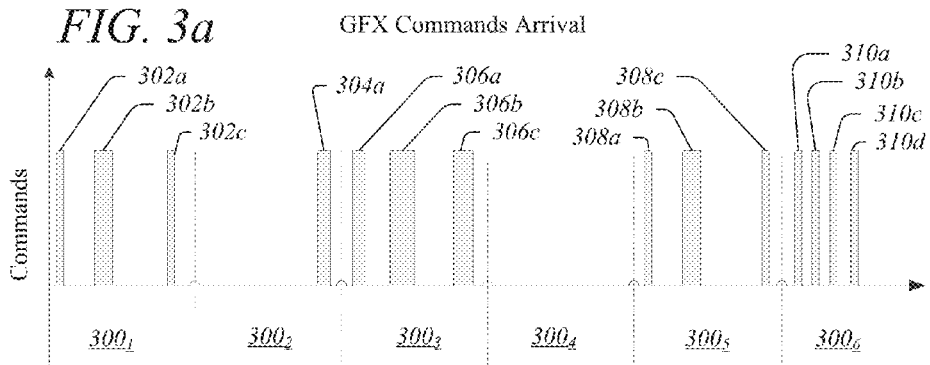
FIGS. 3*a* to 3*d* depict scheduling of graphics commands that illustrate the effect of deferred graphics command rendering in accordance with the present embodiments.

FIGS. 3a to 3d depict scheduling of graphics commands that illustrate the effect of deferred graphics command rendering in accordance with the present embodiments. As noted previously, an application may submit a graphics rendering command at any time for rendering to generate a component of an image for display. When graphics rendering commands are generated by the host application, in conventional operation, a CPU or other component may generate a signal to wake up a graphics processor to render the graphics command. FIG. 3a generally depicts a conventional arrangement illustrating the timing of graphics operations consistent with known procedures. In FIG. 3a, as well as FIGS. 3b to 3d, real time flows from left to right. FIGS. 3a to 3d also extend over six different time periods, which may represent a set of graphics frames $300_1$ to $300_6$, that is, the periods within which an image may be drawn on a display. Depending on the display technology and media being rendered, these periods including vertical blanking typically may range from about 16.6 ms (for 60 Hz or frames per second) to 8.3 ms (for 120 Hz), but may have other values. The vertical dashed lines 340 may represent, for example, Vblank. Notably, a vertical blanking interval may be also represented by the single dashed line 340 even though such an interval extends for a finite duration.

As illustrated in FIG. 3a, when an application is running one or more graphics rendering commands may be generated during different graphics frames of the set of graphics frames $300_1$ to $300_6$. In some graphics frames such as graphics frame $300_4$ no graphics rendering commands may be generated. As shown in FIG. 3a, in graphics frame $300_1$ three graphics rendering commands 302a to 302c are generated, in graphics frame $300_2$ one graphics rendering command 304a is generated, in graphics frame $300_3$ three graphics rendering commands 306a to 306c are generated, in graphics frame $300_5$ three graphics rendering commands 308a to 308c are generated, and in graphics frame $300_6$ four graphics rendering commands 310a to 310d are generated. The graphics rendering commands may vary in size depending on the object to be constructed, for example.

The scenario shown particularly in FIG. 3a is in accordance with conventional techniques in which graphics rendering commands are submitted for rendering by a graphics processor as generated by the application. Thus, for example, the three graphics rendering commands 302a to 302c are sent for rendering at the time of generation by an application, which happen to take place at various instances throughout the graphics frame $300_1$ On the other hand, a single graphics rendering command 304a is generated and is sent towards the end of the graphics frame $300_2$ Similarly to the graphics rendering commands in graphics frame $300_1$ graphics rendering commands 308a to 308c are generated and sent for rendering at various instances throughout the respective graphics frame $300_5$ while graphics rendering commands 310a to 310d are generated and sent for rendering at instances that are clustered more towards the beginning of the graphics frame $300_6$.

Figure 3B:
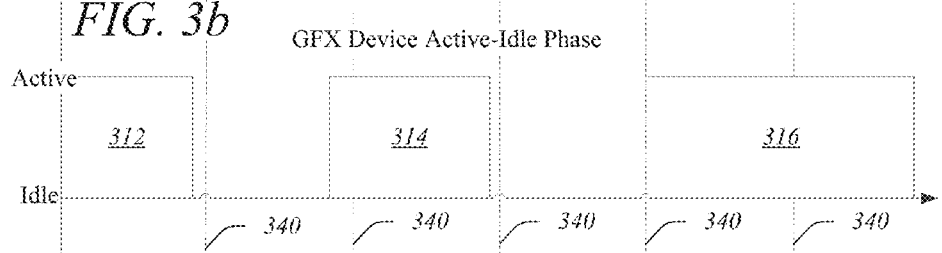

As a consequence of the sending of the graphics rendering commands for rendering, a graphics processor to execute the various graphics rendering commands must be in an active state to retrieve and execute the graphics rendering commands as they are generated. FIG. 3b illustrates the activity of the corresponding graphics processor that renders the graphics rendering commands of FIG. 3a. As shown, the graphics processor transitions from an active to idle state multiple times, and remains in an active state for extended durations. In particular the graphics processor is maintained an active state for an active period 312 that extends over most of the duration of the graphics frame $300_1$, and in an active state for an active period 314 that extends over the final portion of graphics frame $300_2$ and most of the duration of the graphics frame $300_3$ and in an active state for an active period 316 that extends over the entire duration of graphics frame $300_5$ graphics frame $300_6$.

As is evident in frame $300_1$ even though the submission of the graphics rendering commands 302a, 302b, 302c are spaced from one another in time, the graphics processor remains in the active state for the entire time spanned by the graphics rendering commands 302a-302c. This may occur because of required overhead for placing the graphics processor in low power mode, as well as the time required to wake up the graphics processor from a low power state. Accordingly, if the time between submission of successive graphics commands is below a threshold value, the graphics processor may remain in an active state, even if no other processing tasks are performed in the interim between rendering of the graphics rendering commands. In this manner, in the conventional operation generally shown in FIGS. 3a and 3b, the rendering of graphics rendering commands at the time of their generation by an application may result in the graphics processor spending an undue amount of time in an active state.

In accordance with the present embodiments, instead of delivering the graphics rendering commands for rendering at the time of generation of the graphics rendering command by an application, one or more graphics rendering commands may be placed in a graphics command queue until a later time and may be rendered only when necessary to properly display the image created by the graphics rendering command. In this manner, a graphics processor, if asleep, may be awakened and multiple graphics rendering commands may be rendered in a batch only when a threshold for rendering the graphics rendering commands is met, which is based upon a duration required for executing the graphics rendering commands. Since the duration of executing a graphics rendering command does not depend upon whether the command is rendered immediately upon issuance by an application or is deferred for rendering at a subsequent time, the batching of graphics rendering commands and opportunistic rendering once a threshold is met may result in improved utilization of a graphics processor without incurring any unwanted penalties.

Figure 3C:
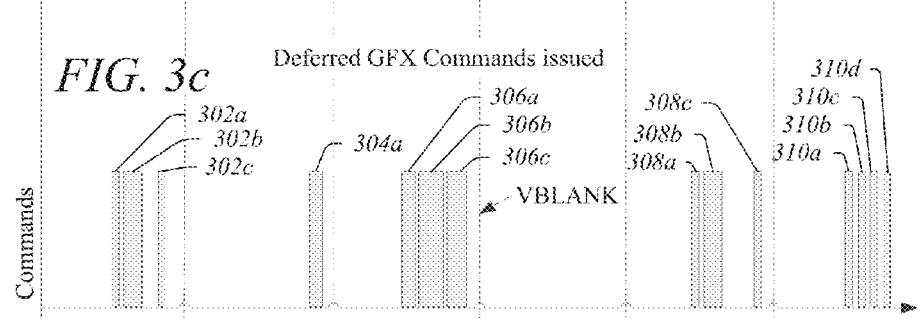

FIG. 3c depicts one embodiment in which the rendering of the same graphics rendering commands of FIG. 3a is deferred at least for some of the graphics rendering commands, such that the graphics rendering commands are rendered in a batch. In each of graphics frame $300_1$, $300_2$, $300_3$, $300_5$, and $300_6$, for which graphics rendering takes place, the graphics rendering commands are rendered toward end of the respective graphics frame before the respective Vblank 340. As suggested by the FIG. 3c, the duration of the rendering of each of the graphics commands 302a to 302c, 304a, 306a to 306c, 308a to 308c, and 310a to 310d, is the same as that of its counterpart in the conventional graphics rendering scenario depicted in FIG. 3a. For this reason, when multiple graphics rendering commands are batched together for rendering as in FIG. 3c, the duration in which the graphic processor remains active to render the graphics rendering commands may be reduced, as illustrated in FIG. 3d.

Figure 3D:
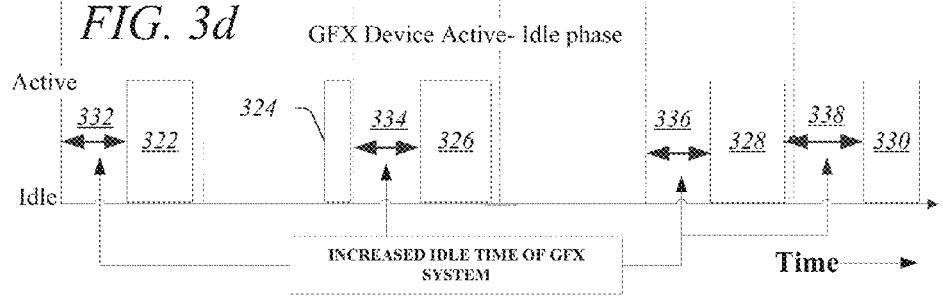

In particular, FIG. 3d illustrates the graphics processor activity afforded by the present embodiments when graphics rendering commands are batched together for rendering. In the scenario illustrated in FIG. 3d it may be assumed that the graphics processor whose activity (that is, the active state periods) is shown does not perform other tasks besides rendering of the graphics rendering commands of FIG. 3c. Thus, when the graphics processor is not occupied by rendering activity, the graphics processor may be scheduled to enter lower power states (idle). As shown in FIG. 3d, for example, in the graphics frame $300_1$ the active period 322 extends only over a latter portion of the graphics frame $300_1$ before the time of Vblank 340. Because the graphics rendering commands 302a to 302c are rendered in a batch, the graphics processor only need by awake for the time required to render the graphics rendering commands 302a to 302c and for additional overhead. This allows the active period 322 afforded by the present embodiments to be smaller than the active period 312 and still render the same graphics rendering commands 302a to 302c in a timely fashion. Similarly, the active periods 324 and 326, which are used to render the respective graphics rendering commands 304a and 306a to 306c, extend for a smaller duration in total as compared to the active period 314, which is used to render the same graphics rendering commands 304a, 306a, 306b, 306c using a conventional graphics rendering approach The same applies to active periods 328 and 330, which are used to render the respective graphics rendering commands 308a to 308c and 310a to 310d. In this case the two active periods 328 and 330 extend for a smaller duration in total as compared to the active period 316, which is used to render the same graphics rendering commands 308a, 308b, 308c, 310a, 310b, 310c, and 310d using a conventional graphics rendering approach.

In total, in the example of FIGS. 3a to 3d, the deferred rendering of graphics rendering commands of the present embodiments facilitates rendering of the same graphics rendering commands as a conventional approach (FIGS. 3a-3b) while providing extra idle periods 332, 334, 336, and 338 during which a graphics processor may remain in an idle mode for longer duration as compared to idle periods afforded by the active periods of a graphics processor required in conventional processing (FIG. 3b).

Turning once more to FIG. 1, in order to better manage active periods of a graphics processor to perform graphics rendering, the graphics command manager 108 may schedule an active period for only that time required to process in a timely fashion those graphics rendering commands present in a queue, such as in the graphics command buffer 106. In various embodiments, the time for executing graphics commands may be estimated or measured a priori as detailed below. Since the number of different graphics rendering commands that may typically be employed is fixed, an execution time may be calculated or estimated for some or all of those graphics rendering commands that may typically be employed. Such a set of execution times may be stored, for example, in the memory 112 and may be accessed during graphics processing by the graphics command manager 108 to estimate a duration for executing (rendering) graphics rendering commands as they are generated by an application.

As further detailed below, the graphics command manager 108 may also monitor actual execution times of commands submitted for rendering during processing of a graphics image or images to adjust the estimation in real time for a running aggregate execution time for those graphics rendering commands that are placed in the graphics command buffer 106. In this manner the graphics command manager 108 may more optimally decide when to submit a batch of queued graphics rendering commands for execution, and thereby when to wake up a dormant graphics processor 104.

Figure 4:
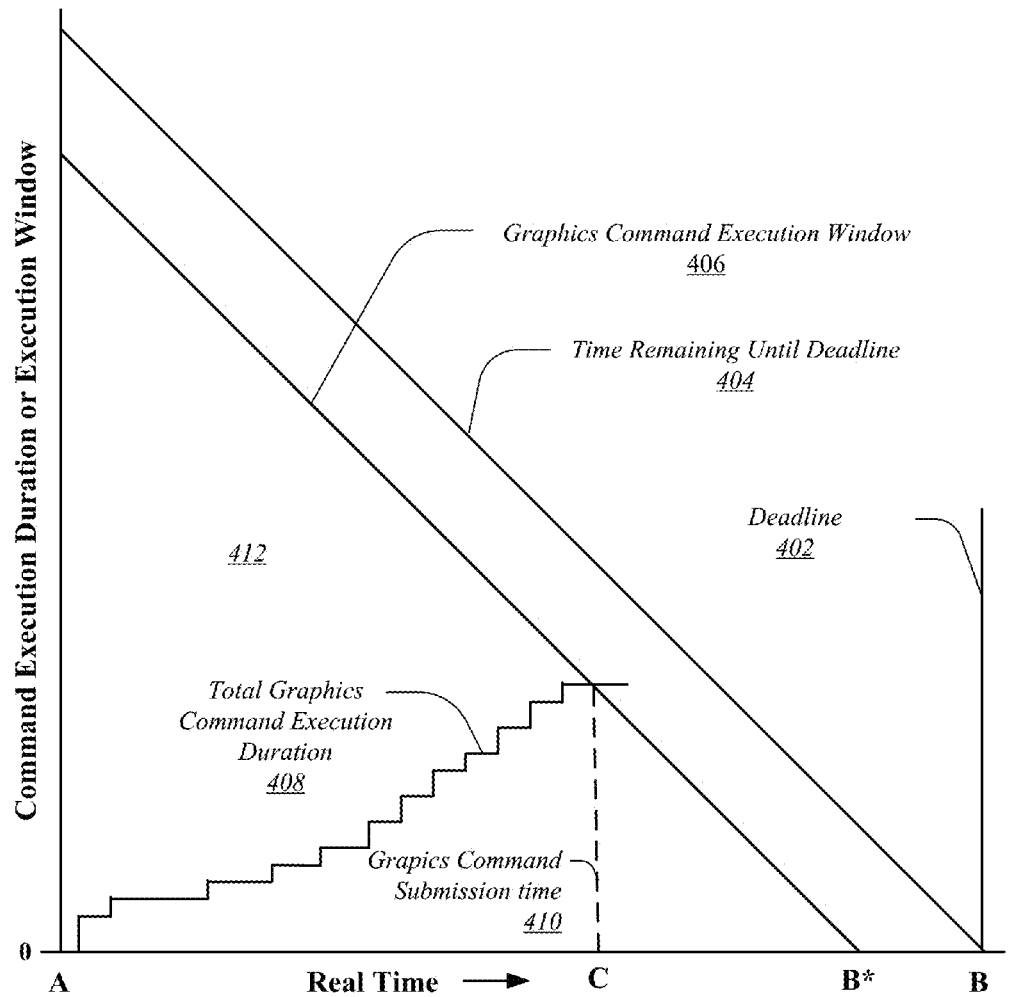
FIG. 4 depicts in graphical form techniques for scheduling graphics rendering commands for execution

FIG. 4 depicts in graphical form techniques for scheduling graphics rendering commands for execution. The abscissa plots real time, which in one example may correspond to one graphics frame between the points A and B. In the example illustrated in FIG. 4, a deadline 402 may represent the end of a graphics frame such as the time of generation of a Vblank interrupt. In some embodiments, graphics commands generated by an application during a graphics frame may be rendered by the time of the deadline denoted at point B. Accordingly, a graphics command manager 108 may manage incoming graphics rendering commands such that the incoming commands (not shown in FIG. 4, but discussed in FIG. 5) may be queued until a point at which a determination is made that the graphics processor 104 is to be awakened to render the queued commands. FIG. 4 in particular depicts a graphical representation of the operation of various parameters that may be employed to determine the time for submitting the queued graphics rendering commands for rendering. As shown in FIG. 4, one line termed "time remaining until deadline" 404 exhibits a linear decrease reaching zero at the deadline. Another line, termed "graphics command execution window" 406 is generally parallel to the "time remaining until deadline" line 404. The graphics command execution window 406 is a parameter that decreases in value during a graphics frame and represents the maximum time available to execute graphics commands such as graphics rendering commands before the deadline 402, while taking into account the time necessary to wake up a graphics processor and any desired margin of error. Thus, the graphics command execution window 406 is always less than the value of the time remaining until deadline line 404.

As also shown in FIG. 4, while the value of the graphics command execution window 406 decreases with time within the interval between A and B, a parameter "total graphics command execution duration" 408 increases with time. This latter parameter represents the total time required to execute the graphics rendering commands that are queued in the graphics command buffer 106 at any given instance. As time passes within a graphics frame and an application generates more graphics commands that are queued for execution, the value of the total graphics command execution duration 408 meets the value of the graphics command execution window 406 at a time corresponding to the point C.

The graphics command execution window 406 may be deemed to represent one edge of a two dimensional triangle-shaped parameter space 412 that shows the maximum time available (line 406) for any given point in real time to execute graphics commands. Thus, at any given real time as shown along the abscissa, any combination of graphics commands that have a duration as shown on the ordinate that is below the graphics command execution window 406 can be executed in sufficient time by deadline 402. The deadline 402 may represent the end of a current frame or the end of a subsequent frame in different embodiments. The graphics command execution window 406 may be deemed to be "open" when curve represented by the total graphics command execution duration 408 lies below the line represented by graphics command execution window 406. When the graphics command execution window is open any graphics rendering commands that have been generated up to the present may be stored in queue for later rendering. When the two entities meet at point C, the graphics command execution window "closes" and at this point the graphics command manager 108 may determine that the graphics processor 104 should be awakened immediately so that the queued graphics commands can be rendered in time to meet the deadline 402. If no graphics commands arrive within a given time frame, at the point B* before deadline 402, the graphics command execution window may automatically close, and may subsequently reopen in a following graphics frame after vertical blanking takes place. If graphics rendering commands are generated and arrive when the graphics command execution window is closed, in various embodiments the arriving commands may be forwarded for immediate execution by the graphics processor.

Figure 5A:
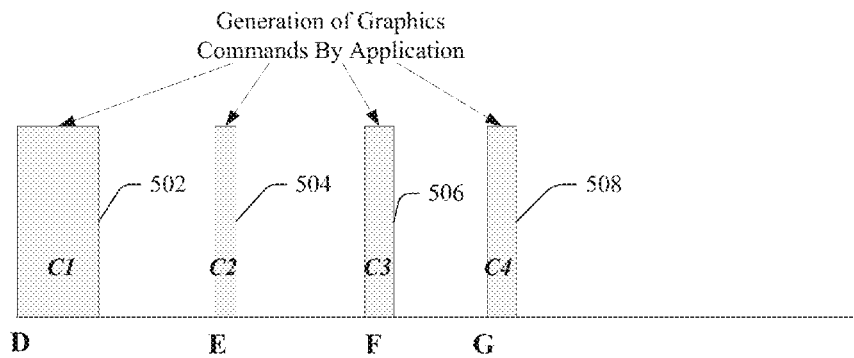
FIGS. 5*a* and 5*b* depicts details of one scenario for determining the time for submitting queued graphics rendering commands consistent with the present embodiments.
Figure 5B:
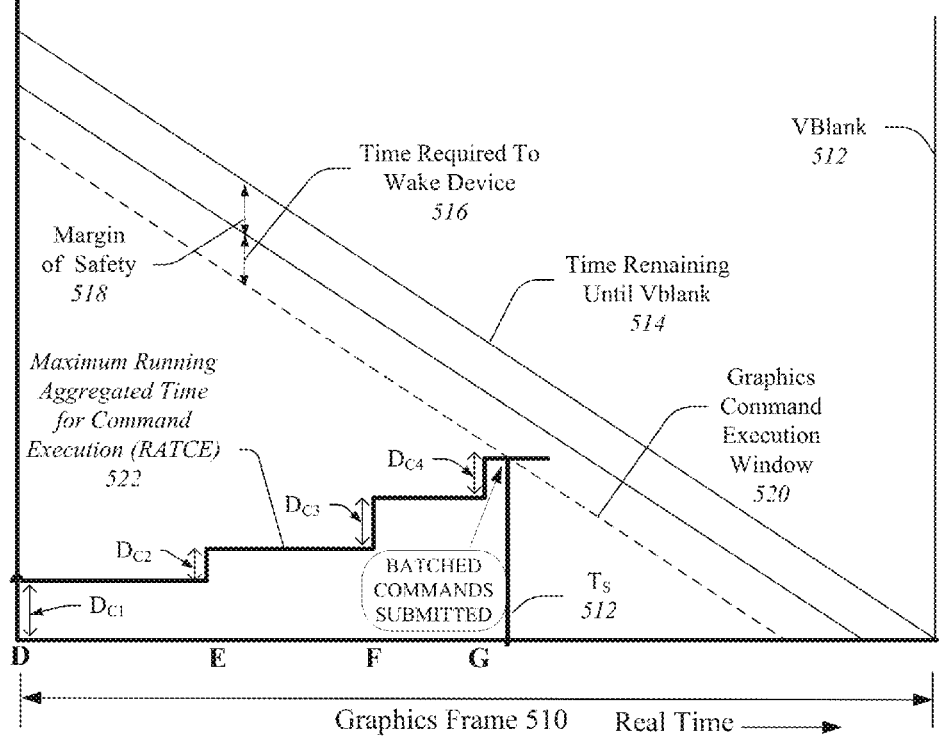

FIGS. 5a and 5b depicts details of one variant of the techniques shown in FIG. 4 for determining the time for submitting queued graphics rendering commands consistent with the present embodiments. As shown in FIG. 5a a series of graphics rendering commands C1 (502), C2 (504), C3 (506), and C4 (508) are generated by an application (not shown) at different instances within a graphics frame 510 (shown in FIG. 5b). The timing of the various graphics rendering commands shown represents the timing of the generation of the commands by an application and not the timing of the execution of the commands. Thus, consistent with the present embodiments, rather than submitting the graphics rendering commands for execution at the time of generation, the graphics command manager 508 may place graphics rendering commands C1 (502), C2 (504), C3 (506), and C4 (508) in the graphics command buffer 106 for deferred rendering at a later time.

In different scenarios, two or more graphics rendering commands 502 to 508 may be the same type of graphics rendering command, all of the graphics rendering commands 502 to 508 may differ from one another in command type, all may be of the same command type, and so forth, depending on the objects to be rendered. In the example suggested by FIG. 5a, there may be different graphics command types among the graphics rendering commands 502 to 508, such that the size of the graphics rendering commands 502 to 508 may differ at least between some of the graphics rendering commands. In addition, the time to execute the different graphics rendering commands may differ according to the command type for each graphics rendering command 502 to 508.

In order for a graphics command manager 508 to determine when to schedule submitting graphics rendering commands as they accrue in the graphics command buffer 106, the graphics command manager 508 may note the instance in real time for the next Vblank interrupt signal, denoted as Vblank 512 in FIG. 5b. At any given instance in time within the graphics frame 510, the graphics command manager 508 may determine the value of the parameter "time remaining until Vblank 514," which allows the determination of the parameter "graphics command execution window" 520 as discussed above with respect to FIG. 4. In this particular example, the value of the parameter graphics command execution window 520 is displaced from the value of "time remaining until Vblank" 514 by a "time to wake device" 516 and "margin of safety" 518. The "time to wake device" 516 may represent an interval required to wake a graphics processor 104 from a sleep state to a fully active state, for example. The margin of safety 518 may be any convenient value and may represent an absolute time in some implementations, but may represent a value that is proportional to other parameters, such as the time remaining until Vblank 514, the time to wake device 516, or a difference between the latter two parameters.

FIG. 5b also depicts one implementation of determining the total graphics command execution duration. In the implementation shown in FIG. 5b, a parameter "Maximum Running Aggregated Time for Command Execution" (RATCE) 522 is shown. The RATCE 522 reflects the total time for executing the graphics rendering commands received during the graphics frame 510. As noted, the graphics command manager 108 may generate and monitor a parameter such as the RATCE 522 in order to track the execution time needed for queued graphics rendering commands. For example, when the command C1 502 is generated at the beginning of the graphics frame 510, the graphics command manager 108 may determine a time $D_{C1}$ that represents the duration for executing command C1 502 when rendered by the graphics processor 104. As shown in FIG. 5b, during the time between point D and the point E, at which a second graphics rendering command C2 504 is generated, the value of RATCE 522 is equal to $D_{C1}$. When the second graphics command C2 504 is generated at point E, an increase in RATCE 520 takes place that reflects the fact that the total time for executing the presently queued graphics rendering commands includes time to render both commands C1 502 and C2 504. Thus, during the time between point E and the point F, at which a third graphics rendering command C3 506 is generated, the value of RATCE 522 is equal to the sum of $D_{C1}$ plus $D_{C2}$.

By calculating and monitoring the RATCE 522, and comparing the RATCE 522 to the graphics command execution window 520, the graphics command manager 108 can ensure that the graphics processor 104 is in an active state when there is sufficient time to render all of the queued commands before Vblank 512. Thus, in the example of FIG. 5b, at the point G when a fourth graphics rendering command C4 508 is generated, the total value of the RATCE 522 equals a sum of $D_{C1}+D_{C2}+D_{C3}+D_{C4}$ which value approaches that of the graphics command window 520. With the lapse of additional time, the values of RATCE 522 and graphics command execution window 520 meet one another, at which point, shown as Ts 512 the graphics command manager 108 may determine that the graphics device 104 is to be immediately awakened and the queued (batched) graphics commands 502 to 508 to be submitted for rendering so that all the graphics rendering commands are executed by Vblank.

In variants of the techniques outlined in FIGS. 5a and 5b, after each graphics rendering command is generated, the RATCE may be compared with the parameter "time remaining until VBlank" 514 and the graphics processor 104 is awakened and queued graphics commands sent to the awakened graphics processor 104 when the value of RATCE exceeds a guard band percentage of the "time to required to wake device" 516 and the time to execute the graphics rendering commands. In one specific implementation when RATCE>/=(X/100 ("time remaining until Vblank"–"Time required to wake the graphics device"), the graphics device is immediately awakened for executing the queued graphics rendering commands. In this case, the value of X is less than 100, so that the fractional value of X represents a guard band percent, such as "75" or "90.".

As discussed previously, in determining a parameter that expresses the time require to execute queued graphics commands, such as RATCE, the duration for executing each graphics command may be based on a previously determined value. For example, the average execution time for a given graphics command may be measured in advance for the graphics processor 104 or for a graphics processor of similar or identical design to that of the graphics processor 104. In one example, this measurement of average execution time may take place under different workload scenarios, such as in an animation, in a video game, in a desktop computer, during two dimensional graphics processing, during three dimensional graphics processing, and so forth. A table may then be created in software that includes average graphics command execution times for multiple different graphics command types. In one example, the graphics command measurements and creation of such a table may be carried out by the manufacturer of the graphics processor 104 and may be supplied in any convenient form for use by a user of the graphics processor 104.

This table may then be employed by a graphics command manager 108 to associate any given graphics rendering command with an execution time. For example, continuing with the example of FIG. 5, when the graphics rendering command C1 502 issues, the graphics command manager may identify the graphics command type for the graphics rendering command C1 502 and may check a data structure or table to determine the predetermined average value of the graphics command execution time for that type of graphics rendering command. This predetermined average value is then used as the value of $D_{C1}$ for the purposes of calculating the RATCE. Similarly, the values $D_{C2}$, $D_{C3}$, and $D_{C4}$ may all be calculated based upon predetermined values for their respective graphics command types.

In other embodiments, the time required to execute a graphics command may be monitored during graphics processing, such as while a graphics application is running that generates the graphics rendering commands C1 502 to C4 508. In this case the graphics command manager 108 may monitor issued graphics commands in one or more graphics frames that a prior to the graphics frame 510 and may determine an average value or best case value for the duration of execution of a given graphics command type. For example, the graphics command C1 502 may represent a first graphics command type, the graphics command C2 504 may represent a second graphics command type, the graphics commands C3 506 and C4 508 may each represent a third graphics command type. In operation, an application that generates the graphics commands of graphics frame 510 may generate beforehand in the prior graphics frames multiple graphics rendering commands that each constitutes a graphics command of either the first, second or third graphics command type. In each instance when a graphics command of the first graphics command type is generated and rendered the duration of rendering for the first graphics command type may be stored, which value may be updated as subsequent graphics rendering commands of the first graphics command type are executed. A similar process may take place for graphics commands of the second and third graphics command types.

Subsequently, at the time of processing of graphics frame 510, the graphics command manager may retrieve a dynamically determined graphics command execution duration value $D_{C1}$ to $D_{C4}$ for each graphics command type corresponding to the respective graphics commands C1 502 to C4 508. In the scenario outlined above, the value of $D_{C3}$ and $D_{C4}$ are the same, since graphics rendering command C3 506 and C4 508 represent the same graphics command type.

In one implementation, an initial value for the execution duration of one or more graphics rendering commands may be prestored for use in determining RATCE, but may be modified while an application is in use by monitoring the actual execution duration of graphics rendering commands and dynamically updating an estimated execution duration for each graphics command type as described above. In this manner the graphics command manager 108 may adjust to the dynamic nature of graphics applications, and as a result provide better ability to adjust calculations for scheduling when to wake up a graphics processor based upon the behavior of the currently running application.

As evident from the procedures outline in FIGS. 5a and 5b, within any given graphics frame, as represented by graphics frame 510, the point at which a graphics processor is to be awakened may be adjusted according to the number and type of graphics rendering commands that arrive during that graphics frame. Thus, if the graphics frame 510 is considered to represent any graphics frame, and time $T_S$ is considered to represent the relative time within that graphics frame, the time for waking up a dormant graphics processor 104 may increase or decrease in accordance with a combination of the number of graphics commands that arrive during the graphics frame and their execution duration. It is to be noted that when graphics rendering commands are generated by an application after $T_S$ but before the Vblank, in accordance with the present embodiments, the graphics rendering commands may be forwarded for immediate execution by the now awake graphics processor 104.

Figure 6:
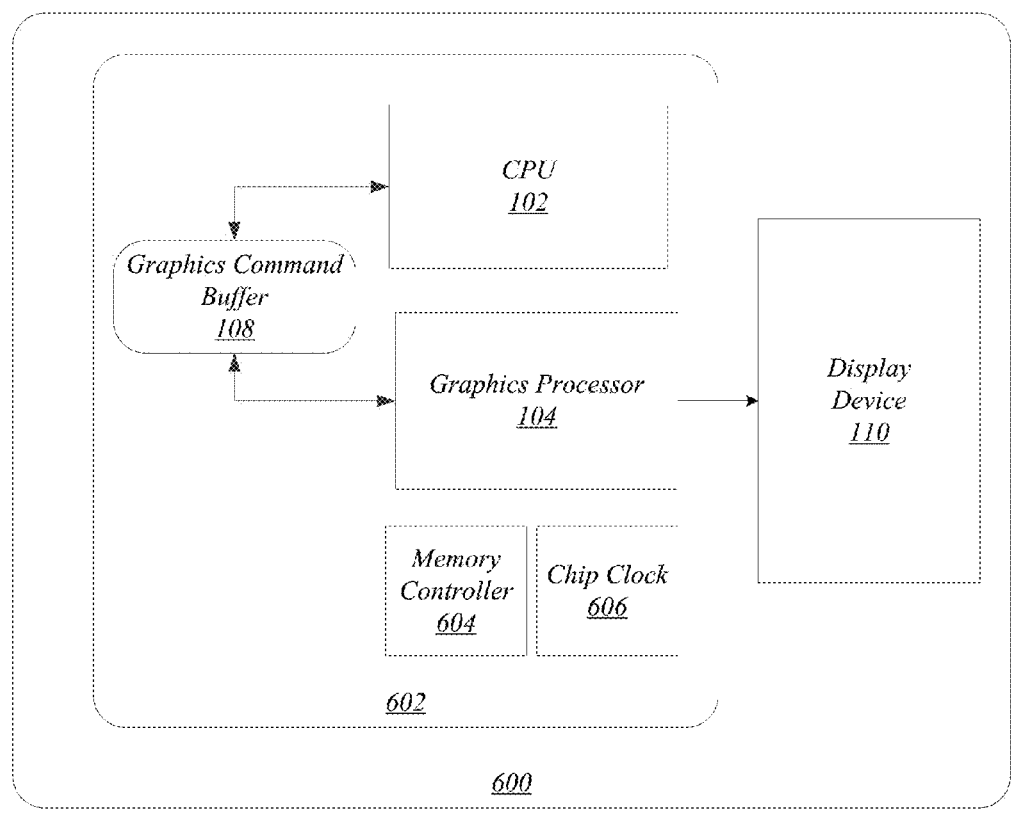
FIG. 6 depicts one embodiment of a system.

One further advantage afforded by the techniques and architecture described above with respect to FIGS. 1 to 5b is the ability to manage system components other than the graphics processor more efficiently. For example, increased idle periods may be provided to other platform components whose operation is linked to the operation of a graphics processor components. In some configurations these components include system memory controllers, chip level clocking, and so forth. FIG. 6 depicts one embodiment of a system 600 in which an SoC 602 includes, in addition to a graphics processor 104 and CPU 102, a memory controller 604 and chip clock 606. In the present embodiments, the low power state for the platform components such as the memory controller 604 and chip clock 606 may also be maintained for greater duration than that afforded by the conventional graphics processor operation.

Figure 7A:
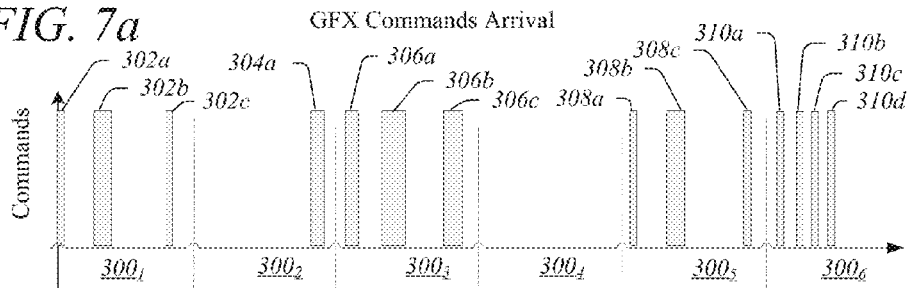
FIGS. 7*a* to 7*f* show the exemplary operation of both graphics processor components and system components in comparison to that of conventional techniques.
Figure 7B:
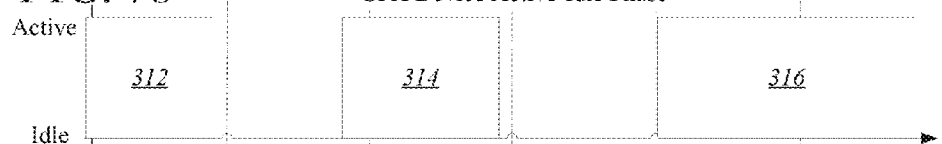
Figure 7C:
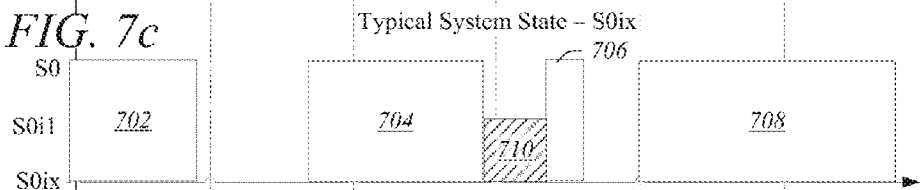

FIGS. 7a to 7f show the operation of both graphics processor components and system components (which include platform components in addition to the graphics processor) that highlight the advantages of the present embodiments. In FIGS. 7a and 7b the conventional generation of graphics rendering commands and the activity of a graphics processor is depicted similarly to that shown in FIGS. 3a to 3b above. In addition, FIG. 7c illustrates a pattern of activity for system components that may take place under conventional operation based upon the graphics processor activity shown in FIG. 3b. In particular, during the graphics frames $300_1$ to $300_6$ the system components exhibit active periods 702, 704, 706, and 708, and intermediate period 710. These correspond to periods in which the platform components wake up from an S0ix state to an active S0 state to perform processing that results in the graphics commands 302 to 310 to be issued. After this processing is performed, the platform components may enter an intermediate power state S0i1 as illustrated by the intermediate period 710. If a long period of idleness is expected, the platform components enter a deeper power savings state such as S0ix shown in FIG. 7c. As detailed therein, the active periods 702 and 708 for the system extend over similar time spans as their counterparts active periods 312 and 316 for the graphics processor. The active period 704 extends over a similar time period as corresponding active period 314 for the graphics processor, except that the active period 704 begins before that of the active period 314.

In addition to active periods for platform components that are necessitated by graphics processor activity depicted in FIG. 7b, another active period 706 for system components takes place during the graphics frame $300_4$. This active period may be used to perform system tasks not necessarily related to graphics processor activity. As further shown in FIG. 7c, the beginning of the active period 706 is sufficiently separated in time from the end of active period 704 to allow the system components to enter an intermediate state SiO1 for the duration of intermediate period 710.

Figure 7D:
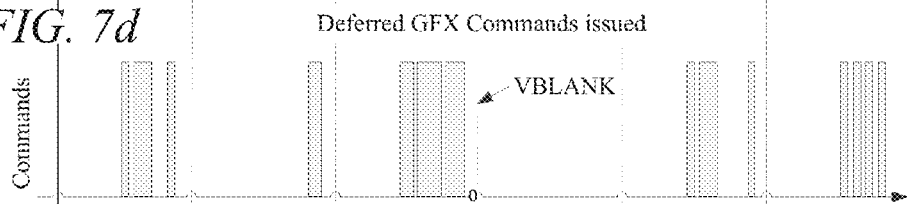
Figure 7E:
Figure 7F:
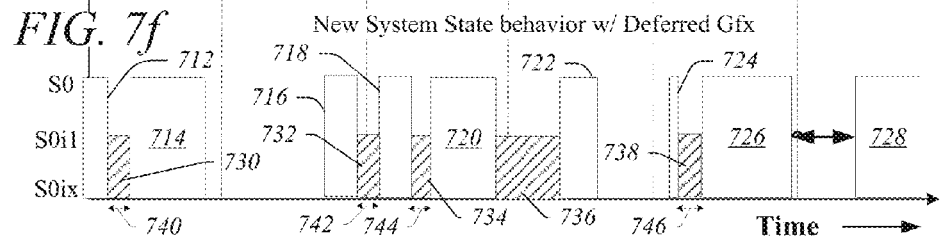

In FIGS. 7d and 7e the generation of graphics rendering commands and the activity of a graphics processor is depicted similarly to that shown for the embodiment depicted in respective FIGS. 3c to 3d above. For clarity, the labeling of individual graphics rendering commands is omitted in FIG. 7d, but corresponds to that shown in FIG. 3c. In addition, FIG. 7f illustrates a pattern of activity for system components that is afforded by the present embodiments based upon the graphics processor activity shown in FIG. 7e. In particular, in FIG. 7f the active periods 714, 716, 720, 726, and 728 for the system components correspond to the respective active periods 322, 324, 326, and 328, and 330 for the graphics processor, as shown in FIG. 7e. During these active periods the system components are in an active state S0 at least to accommodate the activity of the graphics processor.

Besides the aforementioned active periods for the system, the system activity for the embodiment of FIG. 7f is characterized by further active periods 712, 718, 722, and 724, which active periods may be used to perform non-graphics related processing. In addition, a set of intermediate periods 730, 732, 734, 736, and 738 are each located between a respective pair of active periods. As noted above, these intermediate periods, in which system activity is characterized by a state S0i1, may be scheduled when there is sufficient separation in time between successive active periods. In comparison to the total system activity for the conventional arrangement shown in FIG. 7c, the duration 740, 742, 744, and 746 of respective intermediate periods 730, 732, 734 and 738 represents system power savings in which the system components are in a lower power state (S0i1) as compared to that of the conventional arrangement (S0). In comparison to conventional processing of graphics commands, these system power savings provide further power savings in addition to the power savings realized for the graphics processor alone as depicted in FIG. 7e in comparison to FIG. 7b.

In the aforementioned embodiments, scheduling of graphics processor and system component activity is generally based upon the practice of executing graphics rendering commands that are generated in a given graphics frame by the time of the Vblank interrupt that marks the end of that graphics frame. However, in some instances it may be preferable to send updates to the display only when changes to the screen take place. If no updates to a frame occur, the previous frame contents may continue to be displayed to a user. This procedure may be employed, for example, when rendering two dimensional graphics in which a user may not easily perceive small changes in a frame rendered. Thus, if a graphics command(s) is generated sufficiently closely to a Vblank interval, and/or is(are) sufficiently small in size and/or number, the graphics command(s) may be deferred for execution until a subsequent graphics frame.

Figure 8A:
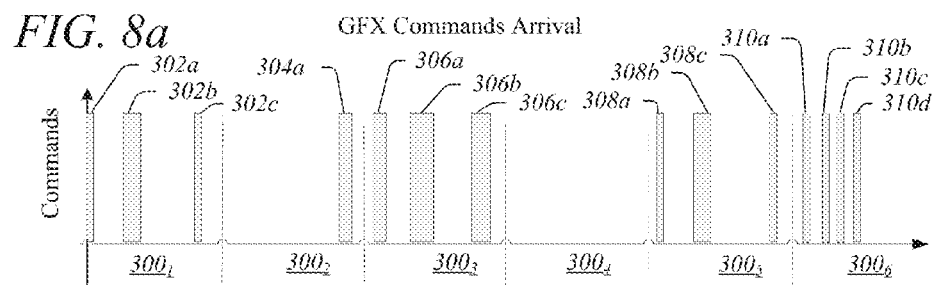
FIGS. 8*a* to 8*f* depict the further operation of graphics processor and system components in comparison to conventional techniques.
Figure 8B:
Figure 8C:
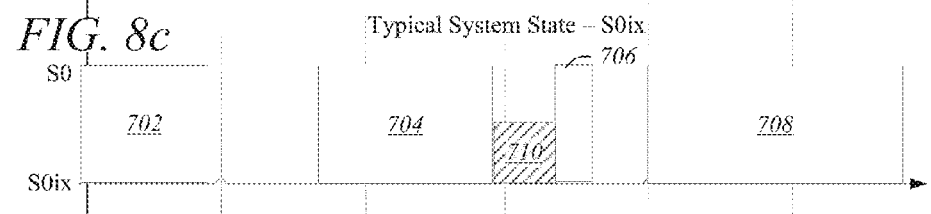
Figure 8D:
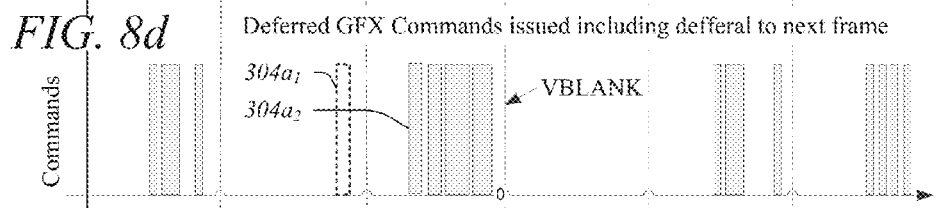

FIGS. 8a to 8f depict the further advantages provided by this technique as compared to conventional graphics processing. For convenience, FIGS. 8a to 8c reproduce the conventional operation for rendering graphics commands and the graphics processor and system activity as shown in FIGS. 7a to 7c. FIG. 8d depicts the graphics rendering according to one embodiment in which a graphics command issued in one graphics frame is deferred for execution until a next graphics frame. For clarity, the labeling of individual graphics rendering commands is omitted for most commands in FIG. 8d, but corresponds to that shown in FIG. 3c. As in the embodiments of FIGS. 3c and 7d, any graphics rendering commands generated within a given graphics frame are grouped for rendering towards a latter portion of the given graphics frame, save for graphics rendering command 304a discussed below.

Notably, because in graphics frame $300_2$ only a single graphics rendering command 304a is generated by an application (see FIG. 3c), and because the graphics rendering command 304a is generated towards the end of the graphics frame $300_2$, it may be possible to defer rendering until the subsequent graphics frame $300_3$ without adversely affecting a user experience, as discussed above. FIG. 8d explicitly depicts such a scenario in which the time of generation of the graphics rendering command 304a is depicted by the notation $304a_1$. In the previous embodiment illustrated in FIG. 7d, the graphics rendering command is executed in the graphics frame $300_2$ at the time suggested by the dashed box $304a_1$. However, in the embodiment of FIG. 8d, the graphics rendering command is instead executed in sequence with the graphics rendering commands 306a to 306c in the following graphics frame $300_3$. This is depicted as the graphics rendering command $304a_2$. In this embodiment, therefore, the RATCE or other parameter used to estimate total time for executing graphics rendering commands, may take into account both the time for executing the graphics rendering command 304a of the previous graphics frame $300_2$ as well as the graphics rendering commands 306a to 306c that are actually generated in the current graphics frame $300_3$.

Figure 8E:
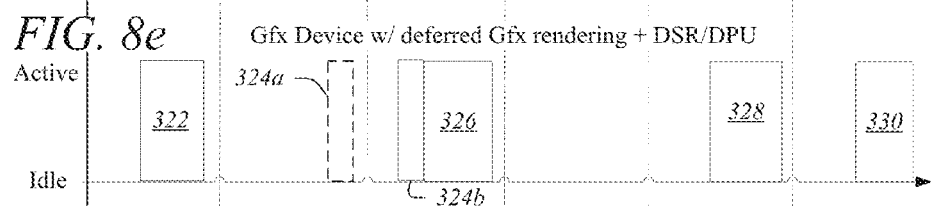
Figure 8F:
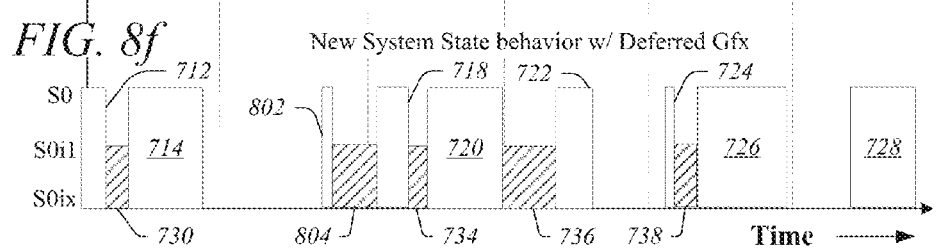

A consequence of the arrangement of graphics command execution shown in FIG. 7d is illustrated in FIGS. 8e and 8f. In FIG. 8e there is shown the graphics processor activity that may arise based upon the graphics rendering command execution shown in FIG. 8d. As illustrated the active periods 322, 326, 328, and 330 extend over the same time periods as their counterparts in the embodiment of FIG. 7e. However, because no graphics rendering command is executed in graphics frame $300_2$ the graphics processor is not awakened in the graphics frame $300_2$. Instead, the graphics processor activity corresponding to the active period 324 of FIG. 7d for rendering the graphics command 304a is shifted to the graphics frame $300_3$. This shifting of active periods for the graphics processor is denoted by a period 324a, which represents graphics processor activity that would have taken place in graphics frame $300_2$ but does not take place because the graphics command 304a is shifted for rendering in the graphics frame $300_3$. Instead, an additional active period 324b is inserted before the active period 326 of the graphics frame $300_3$. In one implementation, the active period 324b and 326 may constitute a single, longer active period, as suggested in FIG. 8e.

As may be apparent from a comparison of FIG. 8e to FIG. 7e, the total duration of active periods for a graphics processor may be the same or similar when the execution of the graphics rendering command 304a is delayed until a next graphics frame. However, even though graphics processor power savings may be modest in this embodiment, FIG. 8f provides an example of power savings in other system components that may be realized as a result of the shifting of the execution of the graphics rendering command 304a. In particular, save for activity spanning the border between the graphics frame $300_2$ and the graphics frame $300_3$ the system activity shown in FIG. 8f is the same as that of FIG. 7f and affords the same power savings as compared to conventional operation shown in FIG. 7c (or FIG. 8c). In the example shown in FIG. 8f, it may be assumed that system components are to be awakened in graphics frame $300_2$ to perform tasks not involving rendering of graphics commands. Thus, the system is awakened for an active period 802. However, because no graphics rendering takes place, the active period 802 may be briefer than active period 716, resulting in a longer intermediate period 804 as compared to intermediate period 732. This combination of shorter active period and longer intermediate period results in a relatively lower level of system power as compared to that of the embodiment in FIG. 7f.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 9:
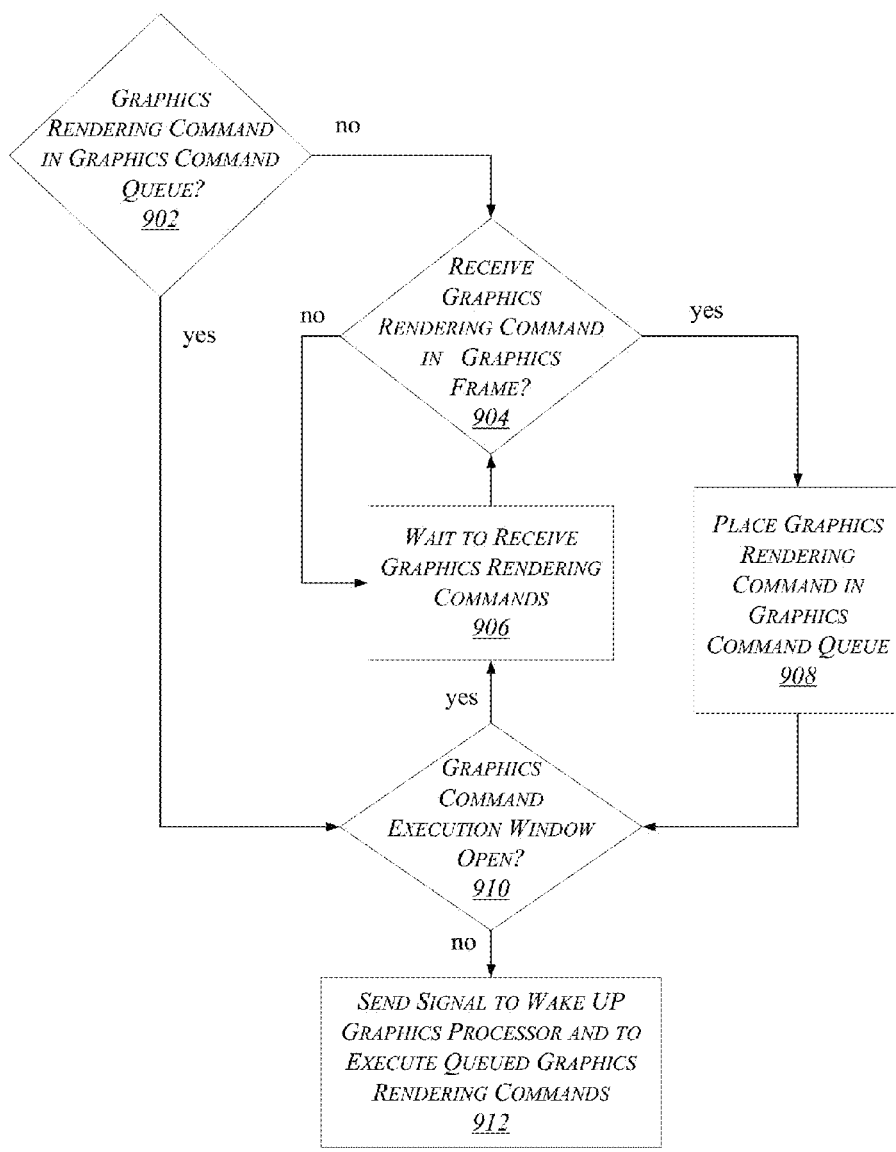
FIG. 9 depicts an exemplary first logic flow.

FIG. 9 depicts an exemplary first logic flow 900. The logic flow 900 may be implemented, for example, by a graphics command manager. At decision block 902, a determination is made as to whether any graphics rendering commands are in a graphics command queue. If not, the flow moves to block 904. At the decision block 904, a decision is made as to whether a graphics rendering command has been received during a graphics frame. If not the flow moves to moves to block 906, where graphics rendering commands are awaited. The flow then returns to block 904. If, at block 904, a graphics rendering command is received, the flow moves to block 908, where the graphics rendering command is placed in the graphics command queue.

If, at block 902, graphics command(s) are already present in the graphics command queue, the flow moves to decision block 910. Likewise, after block 908, the flow then moves to decision block 910, where a determination is made as to whether a graphics command execution window is open. In one example, the graphics command execution window may be deemed to be open if there remains sufficient time within the current graphics frame to execute any queued graphics rendering commands including time to wake up a graphics processor if necessary.

If, at 910, the graphics command execution window remains open, the flow returns to block 906, and thence to block 904. If the graphics command execution window is determined to be closed, the flow moves to block 912 where a signal is sent to wake up the graphics processor as necessary and to execute the queued graphics rendering commands.

Figure 10:
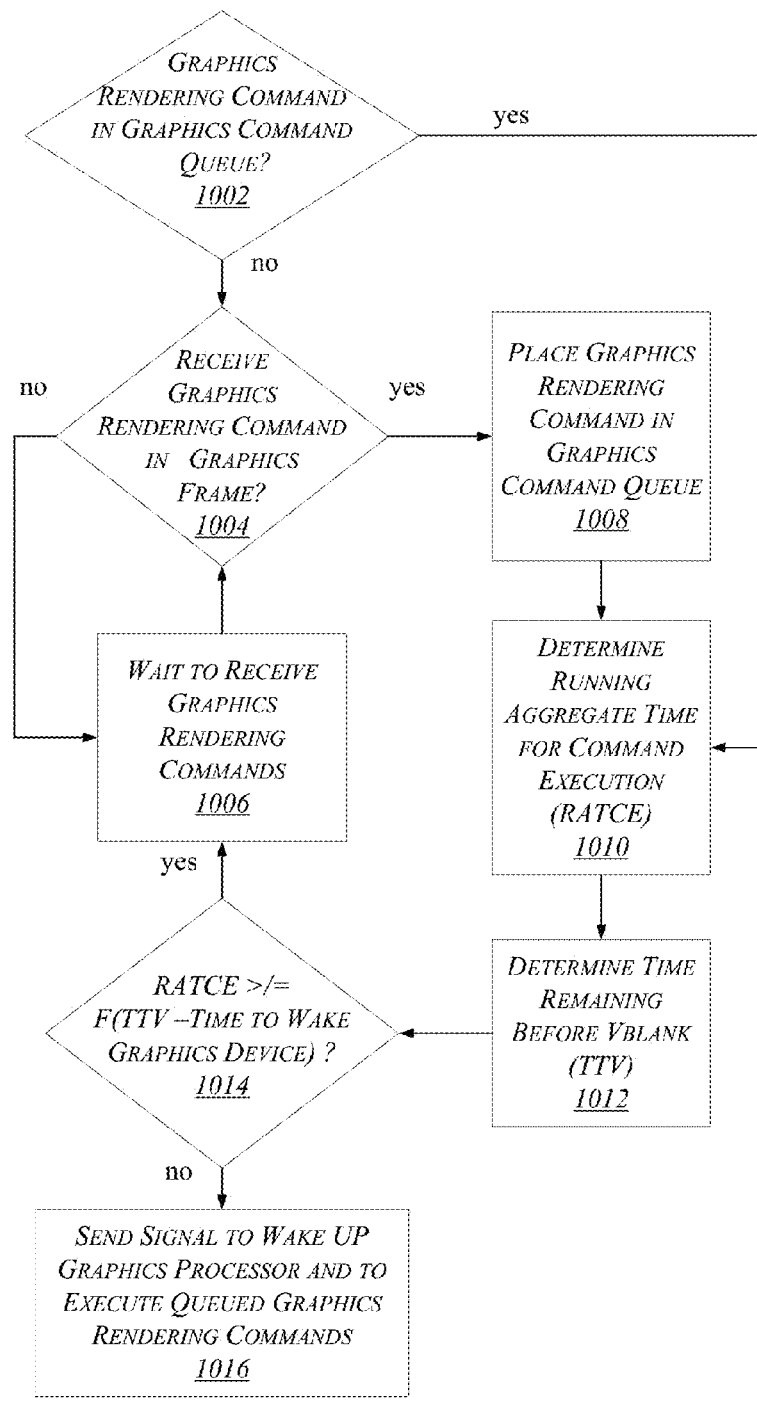
FIG. 10 shows an exemplary second logic flow.

FIG. 10 depicts an exemplary second logic flow 1000. At decision block 1002, a determination is made as to whether any graphics rendering commands are in a graphics command queue. If not, the flow moves to block 1004. At the decision block 1004, a decision is made as to whether a graphics rendering command has been received during a graphics frame. If not the flow moves to moves to block 1006, where graphics rendering commands are awaited. The flow then returns to block 1004. If, at block 1004, a graphics rendering command is received, the flow moves to block 1008. At block 1008, the graphics rendering command is placed in the graphics command queue.

The flow then proceeds to block 1010, where the running aggregate time for command execution (RATCE) is determined based upon the queued graphics rendering command(s). Likewise, if, at block 1002, graphics command(s) are already present in the graphics command queue, the flow moves to decision block 1010. The flow then proceeds to block 1012.

At block 1012, a determination is made as to the time remaining until a vertical blanking interrupt is sent (TTV). The flow then moves to block 1014.

At block 1014, a determination is made as to whether the value of RATCE is equal to or exceeds a threshold that is represented by a fraction F times the difference between the current value of TTV and the time required to wake up the graphics processor to process the queued graphics rendering commands.

If, at 1014, it is determined that the value of RATCE does not exceed the threshold, the flow returns to block 1006, and thence to block 1004. If the value of RATCE does exceed the threshold, the flow moves to block 1016 where a signal is sent to wake up the graphics processor as necessary and to execute the queued graphics rendering commands.

Figure 11:
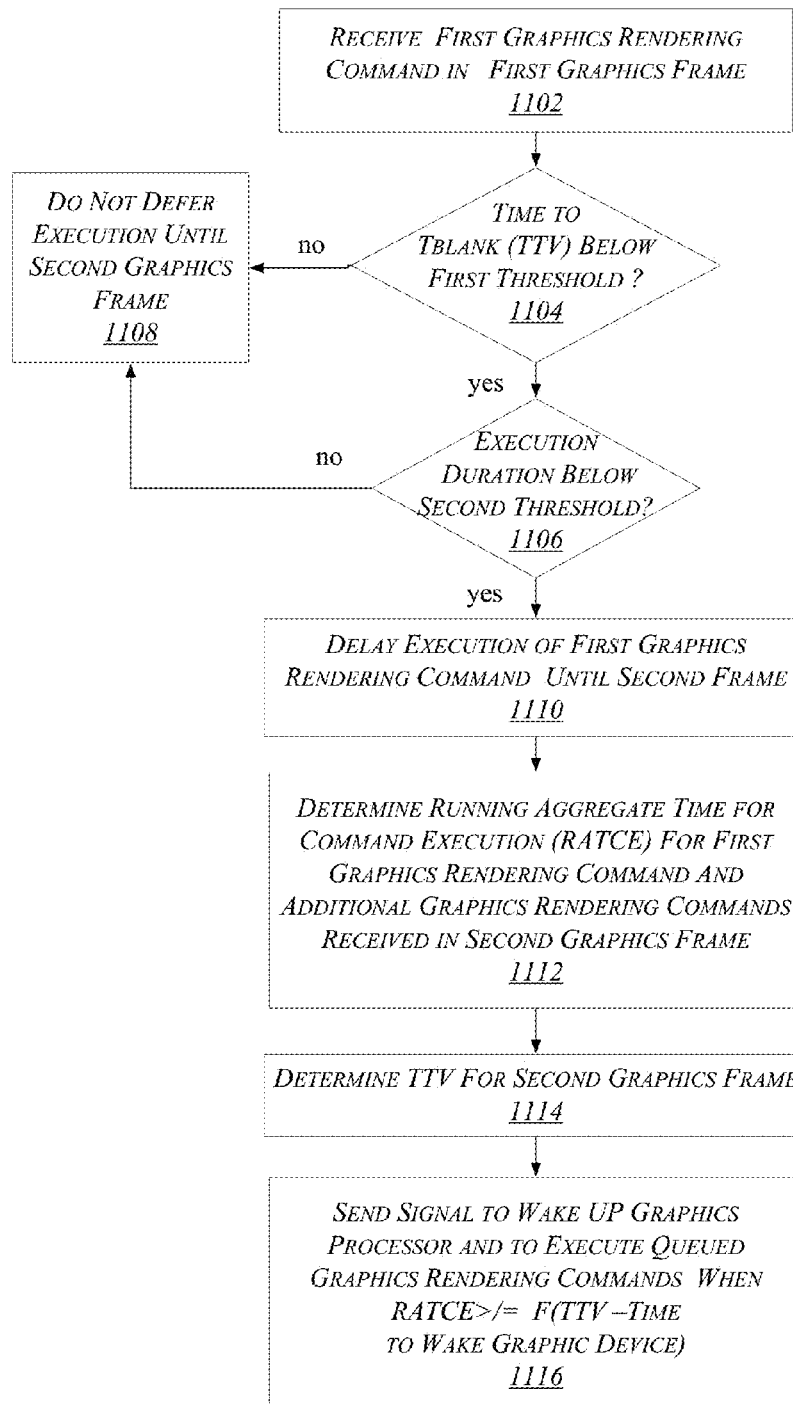
FIG. 11 shows and exemplary third logic flow.

FIG. 11 presents an exemplary third logic flow 1100. At block 1102, a first graphics rendering command is received in a first graphics frame. The flow then proceeds to block 1104. At block 1104, a determination is made as to whether the time remaining until the vertical blanking interrupt is sent (TTV) is below a first threshold. If not, the flow moves to block 1108, where the execution of the first graphics rendering command is not delayed until a second graphics frame.

If, at block 1104, the TTV is below the threshold, the flow moves to block 1106. At decision block 1106, a decision is made as to whether the execution duration for the first graphics rendering command is below a second threshold. If not, the flow proceeds to block 1108. If the execution duration is below the second threshold, the flow moves to block 1110.

At block 1110, a decision is made to delay execution of the first graphics rendering command until the second graphics frame. The flow then proceeds to block 1112. At block 1112, a value of RATCE is determined for the first graphics rendering command and any additional graphics rendering commands received in the second graphics frame. In various implementations this value may be determined in an iterative fashion when one or more graphics rendering commands are received and as generally illustrated in FIG. 10. The flow then proceeds to block 1114.

At block 1114 a value of TTV is determine for the second graphics frame. Again, this value may be determined upon one or more occasions within the second graphics frame. The flow then proceeds to block 1116.

At block 1116, a signal is sent to wake up the graphics processor and to execute the queued graphics rendering commands including the first graphics rendering command when the value of RATCE is greater than or equal to a fraction times the difference between the current value of TTV and the time required to wake up the graphics processor to process the queued graphics rendering commands.

Figure 12:
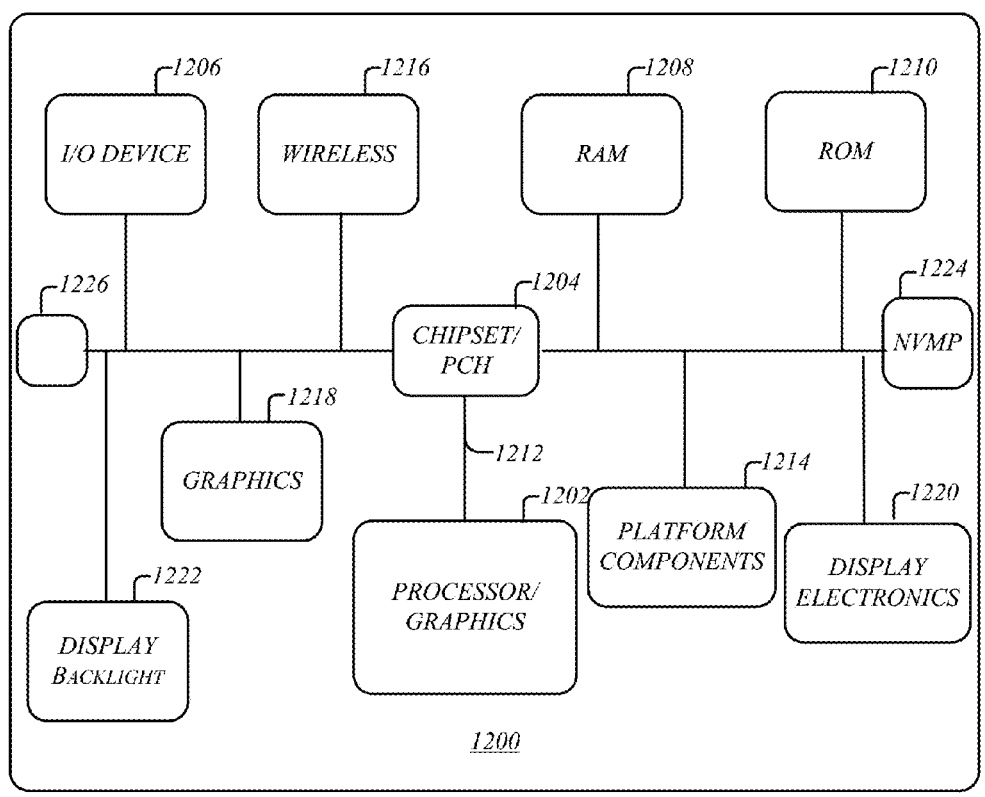
FIG. 12 illustrates an exemplary system architecture.

FIG. 12 is a diagram of an exemplary system embodiment and in particular, FIG. 12 is a diagram showing a platform 1200, which may include various elements. For instance, FIG. 12 shows that platform (system) 1200 may include a processor/graphics core 1202, a chipset/platform control hub (PCH) 1204, an input/output (I/O) device 1206, a random access memory (RAM) (such as dynamic RAM (DRAM)) 1208, and a read only memory (ROM) 1210, display electronics 1220, display backlight 1222, and various other platform components 1214 (e.g., a fan, a crossflow blower, a heat sink, DTM system, cooling system, housing, vents, and so forth). System 1200 may also include wireless communications chip 1216 and graphics device 1218. The embodiments, however, are not limited to these elements.

As shown in FIG. 12, I/O device 1206, RAM 1208, and ROM 1210 are coupled to processor 1202 by way of chipset 1204. Chipset 1204 may be coupled to processor 1202 by a bus 1212. Accordingly, bus 1212 may include multiple lines.

Processor 1202 may be a central processing unit comprising one or more processor cores and may include any number of processors having any number of processor cores. The processor 1202 may include any type of processing unit, such as, for example, CPU, multi-processing unit, a reduced instruction set computer (RISC), a processor that have a pipeline, a complex instruction set computer (CISC), digital signal processor (DSP), and so forth. In some embodiments, processor 1202 may be multiple separate processors located on separate integrated circuit chips. In some embodiments processor 1202 may be a processor having integrated graphics, while in other embodiments processor 1202 may be a graphics core or cores.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

In one embodiment an apparatus may include a memory to store one or more graphics rendering commands in a queue after generation, a processor, and a graphics rendering command manager for execution on the processor to dynamically determine at one or more instances a total execution duration for the one or more graphics rendering commands, the total execution duration comprising a total time to render the one or more graphics rendering commands; and generate a signal to transmit the one or more graphics rendering commands for rendering by a graphics processor when the total execution duration exceeds a graphics rendering command execution window.

In another embodiment, the total execution duration for the one or more graphics rendering commands may comprise a sum of an estimated execution duration for each graphics rendering command, each estimated execution duration comprising a predetermined execution duration for a graphics rendering command type corresponding to that graphics rendering command.

Alternatively, or in addition, in a further embodiment the graphics rendering command manager may be for execution on the processor to measure, during one or more graphics frames prior to the graphics frame, an execution duration for one or more graphics rendering command types, each of the one or more graphics rendering command types corresponding to a graphics rendering command of the one or more graphics rendering commands, to store the measured execution duration for the one or more graphics rendering command types, and to apply the measured execution duration to at least one graphics rendering command of the one or more graphics rendering commands to determine the total execution duration.

Alternatively, or in addition, in a further embodiment, the graphics rendering command module may be for execution on the processor to generate a signal to transmit the one or more graphics rendering commands for rendering when the total execution duration is greater than or equal to a fractional value times a difference between the remaining time before the end of the graphics frame and a wakeup duration for the graphics processor, the fractional value being less than one.

Alternatively, or in addition, in a further embodiment, the graphics rendering command execution window may be based upon a remaining interval before end of a graphics frame.

Alternatively, or in addition, in a further embodiment the end of the graphics frame may be defined by a vertical blanking interval that separates a graphics frame during which the one or more graphics rendering commands were generated and an immediately succeeding graphics frame.

Alternatively, or in addition, in a further embodiment the graphics rendering command manager may be for execution on the processor to monitor a time of receipt and a duration for execution of a first set of graphics rendering commands received in a first graphics frame, and to delay sending a signal to execute the first set of graphics rendering commands until a second graphics frame when the duration for execution is below a first threshold and the time of receipt is below a second threshold.

Alternatively, or in addition, in a further embodiment, the graphics rendering command manager may be for execution on the processor to only schedule for execution the set of first graphics rendering commands in the second graphics frame when the first set of graphics rendering commands are two-dimensional graphics rendering commands.

Alternatively, or in addition, in a further embodiment, the graphics rendering command manager may be for execution on the processor to schedule the set of first graphics rendering commands for execution in the second graphics frame when a total estimated execution duration for the first set of graphics rendering commands and a second set of graphics rendering commands generated in the second graphics frame exceeds a graphics rendering command execution window that is based upon a remaining interval before a vertical blanking interrupt after the second graphics frame.

Alternatively, or in addition, in a further embodiment the processor may be a central processing unit (CPU).

Alternatively, or in addition, in a further embodiment, the graphics rendering command module may be for execution on the processor to lower graphics processor power consumption.

Alternatively, or in addition, in a further embodiment the apparatus may include a digital display to present the graphics objects.

In a further embodiment, a computer implemented method may include dynamically determining at one or more instances a total execution duration for one or more graphics rendering commands, the total execution duration comprising a total time to render the one or more graphics rendering commands and generating a signal to transmit the one or more graphics rendering commands for rendering by a graphics processor when the total execution duration exceeds a graphics rendering command execution window.

In a further embodiment of the computer implemented method, the total execution duration for the one or more graphics rendering command may comprise a sum of an estimated execution duration for each graphics rendering command, each estimated execution duration comprising a predetermined execution duration for a graphics rendering command type corresponding to that graphics rendering command.

Alternatively, or in a addition, in a further embodiment, the computer implemented method may include measuring, during one or more graphics frames prior to the graphics frame, an execution duration for one or more graphics rendering command types, each of the one or more graphics rendering command types corresponding to a graphics rendering command of the one or more graphics rendering commands. The method may further include storing the measured execution duration for the one or more graphics rendering command types, and applying the measured execution duration to at least one graphics rendering command of the one or more graphics rendering commands to determine the total execution duration.

Alternatively, or in a addition, in a further embodiment the computer implemented method may include generating a signal to transmit the one or more graphics rendering commands for rendering when the total execution duration is greater than or equal to a fractional value times a difference between the remaining time before end of the graphics frame and a wakeup duration for the graphics processor, the fractional value being less than one.

Alternatively, or in addition, in a further embodiment the graphics rendering command execution window may be based upon a remaining interval before end of a graphics frame Alternatively, or in a addition, in a further embodiment of the computer implemented method, the end of the graphics frame may be defined by a vertical blanking interval that separates a graphics frame during which the one or more graphics rendering commands were generated and an immediately succeeding graphics frame.

Alternatively, or in a addition, in a further embodiment the computer implemented method may include monitoring a time of receipt and a duration for execution of a first set of graphics rendering commands received in a first graphics frame, and delaying sending a signal to execute the first set of graphics rendering commands until a second graphics frame when the duration for execution is below a first threshold and the time of receipt is below a second threshold.

Alternatively, or in a addition, in a further embodiment the computer implemented method may include only scheduling for execution the set of first graphics rendering commands in the second graphics frame when the first set of graphics rendering commands are two-dimensional graphics rendering commands.

Alternatively, or in a addition, in a further embodiment the computer implemented method may include scheduling the set of first graphics rendering commands for execution in the second graphics frame when a total estimated execution duration for the first set of graphics rendering commands and a second set of graphics rendering commands generated in the second graphics frame exceeds a graphics rendering command execution window that is based upon a remaining interval before a vertical blanking interrupt after the second graphics frame.

In a further embodiment, an apparatus may be configured to perform the method of any one of the preceding embodiments.

In another embodiment, at least one machine readable medium may comprise a plurality of instructions that in response to being executed on a computing device, cause the computing device to carry out a method according to any one of the preceding embodiments.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a computer-readable medium or article which may store an instruction or a set of instructions that, if executed by a computer, may cause the computer to perform a method and/or operations in accordance with the embodiments. Such a computer may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments

What is claimed is:

1. An apparatus, comprising:
a memory to store one or more graphics rendering commands in a queue after generation; and
a processor coupled to the memory and configured to implement a graphics rendering command manager to:
dynamically determine at one or more instances in a graphics frame a total execution duration for the one or more graphics rendering commands, the total execution duration comprising a total time to render the one or more graphics rendering commands;
generate a signal to transmit the one or more graphics rendering commands for rendering by a graphics processor when the total execution duration exceeds a graphics rendering command execution window, and
wherein the graphics rendering command manager further to
measure, during one or more graphics frames prior to the graphics frame, an execution duration for one or more graphics rendering command types, each of the one or more graphics rendering command types corresponding to a graphics rendering command of the one or more graphics rendering commands,
store the measured execution duration for the one or more graphics rendering command types,
apply the measured execution duration to at least one graphics rendering command of the one or more graphics rendering commands to determine the total execution duration, and
generate a signal to transmit the one or more graphics rendering commands for rendering when the total execution duration is greater than or equal to a fractional value times a difference between the remaining time before the end of the graphics frame and a wakeup duration for the graphics processor, the fractional value being less than one.

2. The apparatus of claim 1, the total execution duration for the one or more graphics rendering commands comprising a sum of an estimated execution duration for each graphics rendering command, each estimated execution duration comprising a predetermined execution duration for a graphics rendering command type corresponding to that graphics rendering command.

3. The apparatus of claim 1, the graphics rendering command execution window based on a remaining interval before an end of the graphics frame, wherein the end of the graphics frame being defined by a vertical blanking interval that separates a graphics frame during which the one or more graphics rendering commands were generated and an immediate succeeding graphics frame.

4. The apparatus of claim 1, wherein the processor comprises a central processing unit (CPU), and wherein the graphics rendering command manager is to lower graphics processor power consumption.

5. The apparatus of claim 1, comprising a digital display to present the graphics objects.

6. An apparatus, comprising:
a memory to store one or more graphics rendering commands in a queue after generation; and
a processor coupled to the memory and configured to implement a graphics rendering command manager to:
dynamically determine at one or more instances in a graphics frame a total execution duration for the one or more graphics rendering commands, the total execution duration comprising a total time to render the one or more graphics rendering commands;
generate a signal to transmit the one or more graphics rendering commands for rendering by a graphics processor when the total execution duration exceeds a graphics rendering command execution window;
monitor a time of receipt and a duration for execution of a first set of graphics rendering commands received in a first graphics frame; and
delay sending a signal to execute the first set of graphics rendering commands until a second graphics frame when the duration for execution is below a first threshold and the time of receipt is below a second threshold,
wherein the graphics rendering command manager to only schedule for execution the set of first graphics rendering commands in the second graphics frame when the first set of graphics rendering commands are two-dimensional graphics rendering commands, and
wherein, the graphics rendering command manager for execution on the processor to schedule the set of first graphics rendering commands for execution in the second graphics frame when a total estimated execution duration for the first set of graphics rendering commands and a second set of graphics rendering commands generated in the second graphics frame exceeds a graphics rendering command execution window that is based upon a remaining interval before a vertical blanking interrupt after the second graphics frame.

7. At least one non-transitory computer-readable storage medium comprising instructions that, when executed, cause a system to:
dynamically determine at one or more instances a total execution duration for the one or more graphics rendering commands, the total execution duration comprising a total time to render the one or more graphics rendering commands, wherein dynamically determining the total execution includes monitoring a time of receipt and a duration for execution of a first set of graphics rendering commands received in a first graphics frame; and
generate a signal to transmit the one or more graphics rendering commands for rendering by a graphics processor when the total execution duration exceeds a graphics rendering command execution window, wherein generating the signal includes delaying sending a signal to execute the first set of graphics rendering commands until a second graphics frame when the duration for execution is below a first threshold and the time of receipt is below a second threshold.

8. The at least one non-transitory computer-readable storage medium of claim 7, the total execution duration for the one or more graphics rendering command comprising a sum of an estimated execution duration for each graphics rendering command, each estimated execution duration comprising a predetermined execution duration for a graphics rendering command type corresponding to that graphics rendering command.

9. The at least one non-transitory computer-readable storage medium of claim 7 comprising instructions that, when executed, cause the system to:

measure, during one or more graphics frames prior to the graphics frame, an execution duration for one or more graphics rendering command types, each of the one or more graphics rendering command types corresponding to a graphics rendering command of the one or more graphics rendering commands;

store the measured execution duration for the one or more graphics rendering command types; and apply the measured execution duration to at least one graphics rendering command of the one or more graphics rendering commands to determine the total execution duration.

10. The at least one non-transitory computer-readable storage medium of claim 7 comprising instructions that, when executed, cause the system to: only schedule for execution the set of first graphics rendering commands in the second graphics frame when the first set of graphics rendering commands are two-dimensional graphics rendering commands; and schedule the set of first graphics rendering commands for execution in the second graphics frame when a total estimated execution duration for the first set of graphics rendering commands and a second set of graphics rendering commands generated in the second graphics frame exceeds a graphics rendering command execution window that is based upon a remaining interval before a vertical blanking interrupt after the second graphics frame.

11. At least one non-transitory computer-readable storage medium comprising instructions that, when executed, cause a system to:

dynamically determine at one or more instances a total execution duration for the one or more graphics rendering commands, the total execution duration comprising a total time to render the one or more graphics rendering commands; and generate a signal to transmit the one or more graphics rendering commands for rendering by a graphics processor when the total execution duration exceeds a graphics rendering command execution window, wherein generating the signal to transmit the one or more graphics rendering commands for rendering occurs when the total execution duration is greater than or equal to a fractional value times a difference between the remaining time before end of the graphics frame and a wakeup duration for the graphics processor, the fractional value being less than one, wherein the graphics rendering command execution window being based on a remaining interval before end of a graphics frame.

12. The at least one non-transitory computer-readable storage medium of claim 11, the end of the graphics frame being defined by a vertical blanking interval that separates a graphics frame during which the one or more graphics rendering commands were generated and an immediately succeeding graphics frame.

13. A computer implemented method, comprising:

dynamically determining at one or more instances a total execution duration for one or more graphics rendering commands, the total execution duration comprising a total time to render the one or more graphics rendering commands, including monitoring a time of receipt and a duration for execution of a first set of graphics rendering commands received in a first graphics frame;

generating a signal to transmit the one or more graphics rendering commands for rendering by a graphics processor when the total execution duration exceeds a graphics rendering command execution window, including delaying sending a signal to execute the first set of graphics rendering commands until a second graphics frame when the duration for execution is below a first threshold and the time of receipt is below a second threshold.

14. The computer implemented method of claim 13, the total execution duration for the one or more graphics rendering command comprising a sum of an estimated execution duration for each graphics rendering command, each estimated execution duration comprising a predetermined execution duration for a graphics rendering command type corresponding to that graphics rendering command.

15. The computer implemented method of claim 13, comprising:

measuring, during one or more graphics frames prior to the graphics frame, an execution duration for one or more graphics rendering command types, each of the one or more graphics rendering command types corresponding to a graphics rendering command of the one or more graphics rendering commands;

storing the measured execution duration for the one or more graphics rendering command types; and applying the measured execution duration to at least one graphics rendering command of the one or more graphics rendering commands to determine the total execution duration.

16. The computer implemented method of claim 13 comprising only scheduling for execution the set of first graphics rendering commands in the second graphics frame when the first set of graphics rendering commands are two-dimensional graphics rendering commands, and further comprising scheduling the set of first graphics rendering commands for execution in the second graphics frame when a total estimated execution duration for the first set of graphics rendering commands and a second set of graphics rendering commands generated in the second graphics frame exceeds a graphics rendering command execution window that is based upon a remaining interval before a vertical blanking interrupt after the second graphics frame.

17. A computer implemented method, comprising:

dynamically determining at one or more instances a total execution duration for one or more graphics rendering commands, the total execution duration comprising a total time to render the one or more graphics rendering commands, generating a signal to transmit the one or more graphics rendering commands for rendering by a graphics processor when the total execution duration exceeds a graphics rendering command execution window, including generating the signal to transmit the one or more graphics rendering commands for rendering when the total execution duration is greater than or equal to a fractional value times a difference between the remaining time before end of the graphics frame and a wakeup duration for the graphics processor, the fractional value being less than one, the graphics rendering command execution window being based upon a remaining interval before end of a graphics frame, and the end of the graphics frame being defined by a vertical blanking interval that separates a graphics frame during which the one or more graphics rendering commands were generated and an immediately succeeding graphics frame.

* * * * *